United States Patent [19]
Ballentine

[11] 3,951,525
[45] Apr. 20, 1976

[54] HEAT AND LIGHT REFLECTING SPANDREL

[75] Inventor: John D. Ballentine, Monroeville, Pa.

[73] Assignee: PPG Industries, Inc., Pittsburgh, Pa.

[22] Filed: Nov. 27, 1974

[21] Appl. No.: 527,674

Related U.S. Application Data

[63] Continuation-in-part of Ser. No. 291,430, Sept. 22, 1972, Pat. No. 3,869,198.

[52] U.S. Cl............................... 350/259; 350/281; 428/913
[51] Int. Cl.²........................................ G03B 17/00
[58] Field of Search .......... 350/258, 259, 260, 261, 350/262, 264, 265, 280, 281; 240/2.1; 428/38, 212, 913

[56] References Cited
UNITED STATES PATENTS

| | | | |
|---|---|---|---|
| 2,397,947 | 4/1946 | Colbert | 350/281 |
| 2,631,498 | 3/1953 | Barkley | 350/281 |
| 3,308,004 | 3/1967 | Rouault | 350/258 X |
| 3,537,944 | 11/1970 | Grubb et al. | 350/259 X |
| 3,630,809 | 12/1971 | Edwards | 350/264 X |

FOREIGN PATENTS OR APPLICATIONS

| | | | |
|---|---|---|---|
| 1,056,063 | 1/1967 | United Kingdom | 350/258 |

*Primary Examiner*—Fred L. Braun
*Attorney, Agent, or Firm*—Donald Carl Lepiane

[57] ABSTRACT

Durable glass spandrels are provided with transparent light and heat reflective coatings on the inwardly glazed glass surface and with substantially opaque ceramic enamel coatings adhered to the transparent light and heat reflective coatings. The spandrels are light and heat reflecting and provide for aesthetically matched vision and spandrel areas in curtainwall construction by utilizing a ceramic enamel coating which reflects light in the same spectral region of light transmitted by the transparent coating and glass combination.

2 Claims, 3 Drawing Figures

HEAT AND LIGHT REFLECTING SPANDREL

RELATED APPLICATIONS

This application is a continuation-in-part of U.S. Pat. application Ser. No. 291,430 filed on Sept. 22, 1972, now U.S. Pat. No. 3,869,198, in the name of John D. Ballentine and entitled "Heat and Light Reflecting Spandrel."

BACKGROUND OF THE INVENTION

This invention relates to light and heat reflecting glazing units. These architectural glazing units are particularly suited for installation in the spandrel areas of curtainwall construction.

A spandrel area, as the term is used herein, refers to the opaque area, as contrasted to the vision area of a curtainwall, which is formed by the use of spandrel panels which are either intrinsically opaque or are rendered opaque by various backing or coating materials. Spandrel panels are designed to thermally isolate and conceal certain portions of the exterior structure of a building, as well as conceal interiorly located building fixtures. Thus, spandrel panels or spandrels are frequently employed to conceal floor slabs, the vertical span between floors and ceilings or between successive viewing closures, heating and air conditioning convectors and the like. Spandrel panels are principally employed to conceal those portions of a building that would not be aesthetically pleasing if capable of being viewed from the exterior of a building. However, spandrel panels also find use in building zones where it is desired to maintain a degree of privacy, such as at the ground level of a building.

In the past, various attempts have been directed toward producing spandrel panels that closely match or pleasingly contrast in color and reflectivity with adjacent, transparent glass panels in the viewing or vision areas of a building.

With the development of highly reflective transparent metal and metal oxide coatings, it has been an objective to develop spandrel panels which would match or harmonize with the coated glass vision panels to be glazed adjacent to spandrel panels. Because the back lighting conditions differ greatly from occupied spaces behind vision panels and service spaces or structural spaces behind spandrel panels, it has been difficult in the past to find spandrel panel combinations which could provide this matching or harmonizing appearance.

SUMMARY OF THE INVENTION

This invention relates to an article, e.g., a spandrel panel for reflecting visible light. The article includes a transparent substrate having a first major surface and a second major surface opposite to the first major surface. A transparent reflective coating is disposed over substantially all of the first major surface of the substrate. The transparent reflective coating has (1) a transmitted dominant wavelength for visible light which is determined by transmittance to visible light of the substrate and the transparent, reflective coating and (2) a reflectance to visible light which is determined by the transparent reflective coating and the second surface of the substrate. An opaque, reflective coating is disposed over substantially all of the transparent reflective coating. The opaque, reflective coating has a reflective dominant wavelength of visible light substantially equivalent to the transmitted dominant wavelength to provide the article with a total reflectance to visible light. The total reflectance to visible light of the opaque coating exceeds the visible light reflected from (1) the transparent, reflective coating and (2) the second surface of the substrate. Further, the opaque coating has a dominant wavelength substantially equivalent to the dominant wavelength of light transmitted through the transparent reflective coating and the substrate.

This invention also relates to a curtainwall for a structure using the combination of vision panels and spandrel panels to provide a color harmonizing appearance to the eye under external lighted conditions.

The opaque coating is selected to have a reflective dominant wavelength substantially the same as the dominant wavelength, characterizing the light transmission of a combination of the transparent, reflecting coating and the transparent substrate. Preferably, the opaque coating has an excitation purity exceeding that for the transmission of the transparent, reflecting coating in combination with the substrate. This greater saturation or purity of color for the opaque coating is particularly important for spandrels in buildings so glazed that the interior lighting is from transmitted outdoor light.

The transparent, reflecting coating may be a metal or metal oxide coating or may be a combination of films to produce interference colors. If the coating is metallic and subject to oxidation if exposed it is preferably overcoated with a protective coating of silica or the like. Although conventional metal coatings are suitable, metal oxide coatings are preferable because of their inherent durability. Any transparent, reflective, metal oxide coating suitable for use in vision area glazing may be employed.

The metal oxide coatings preferred in the present invention include the oxides of tin, chromium, titanium, iron, silica, aluminum, nickel, lead, copper, zinc, vanadium, tungsten, tantalum and cobalt. The most preferred metal oxide coatings comprise the oxides of cobalt, chromium and iorn. Coatings comprised of mixtures of oxides of two or more metals are also preferred. The preferred oxides have been found to be sufficiently durable for outside glazing and are efficiently deposited by known methods as described below.

The preferred transparent substrates are glasses, with common soda-lime-silica glasses particularly preferred. Clear or tinted glasses may be employed. For example heat absorbing glasses, such as those sold under the trademarks, SOLEX, SOLARGRAY and SOLARBRONZE may be used. Examples of such glasses are set forth in U.S. Pat. Nos. 3,296,004 and Re. 25,312 to Duncan and to Duncan et al.

The opaque coating is preferably a ceramic enamel which is durable and can withstand abrasion during installation and temperature changes in use without scratching or spalling. Glass frit enamels, for example lead borosilicate glass frit enamels, may be used effectively.

It is desirable for the frit or enamel to have a coefficient of expansion less than the glass substrate because this difference in expansion results in the enamel being in a state of compression upon cooling of the coated article from the enamel firing temperature to room temperature. A more durable article results when the enamel is in a state of compression.

Alumina, silica, boric oxide, lead oxide, potassia, and soda are typical constituents in the glass enamels employed in preparing the articles of this invention. Other materials may also be present as constituents in the glass enamels employed. Some of these other constituents may include calcium oxide, barium oxide, zinc oxide, magnesium oxide, strontium oxide and the like as materials which contribute to the physical properties of the ceramic enamel. Other ingredients may also be present to impart color to the ceramic enamel and to act as opacifiers. Such materials include titanium dioxide, cobalt oxide, the oxides of manganese, chromium copper oxide, iron chromate, potassia dichromate, lead chromite and the like.

Various methods may be employed for producing the metal oxide coatings of the present invention. Methods for preparing tin oxide films include the methods described in U.S. Pat. Nos. 2,566,346; 3,107,177; 3,185,586 and the like. Iron, cobalt, chromium and other metals of groups IV, V, VI, VII, and VIII are preferably applied by pyrolization techniques as disclosed in U.S. Pat. Nos. 3,202,054; 3,081,200 and 3,660,061. Other techniques such as vacuum deposition and cathodic sputtering may also be employed to produce metal oxide films for the articles of this invention.

DESCRIPTION OF THE PREFERRED EMBODIMENTS

Figure 1:
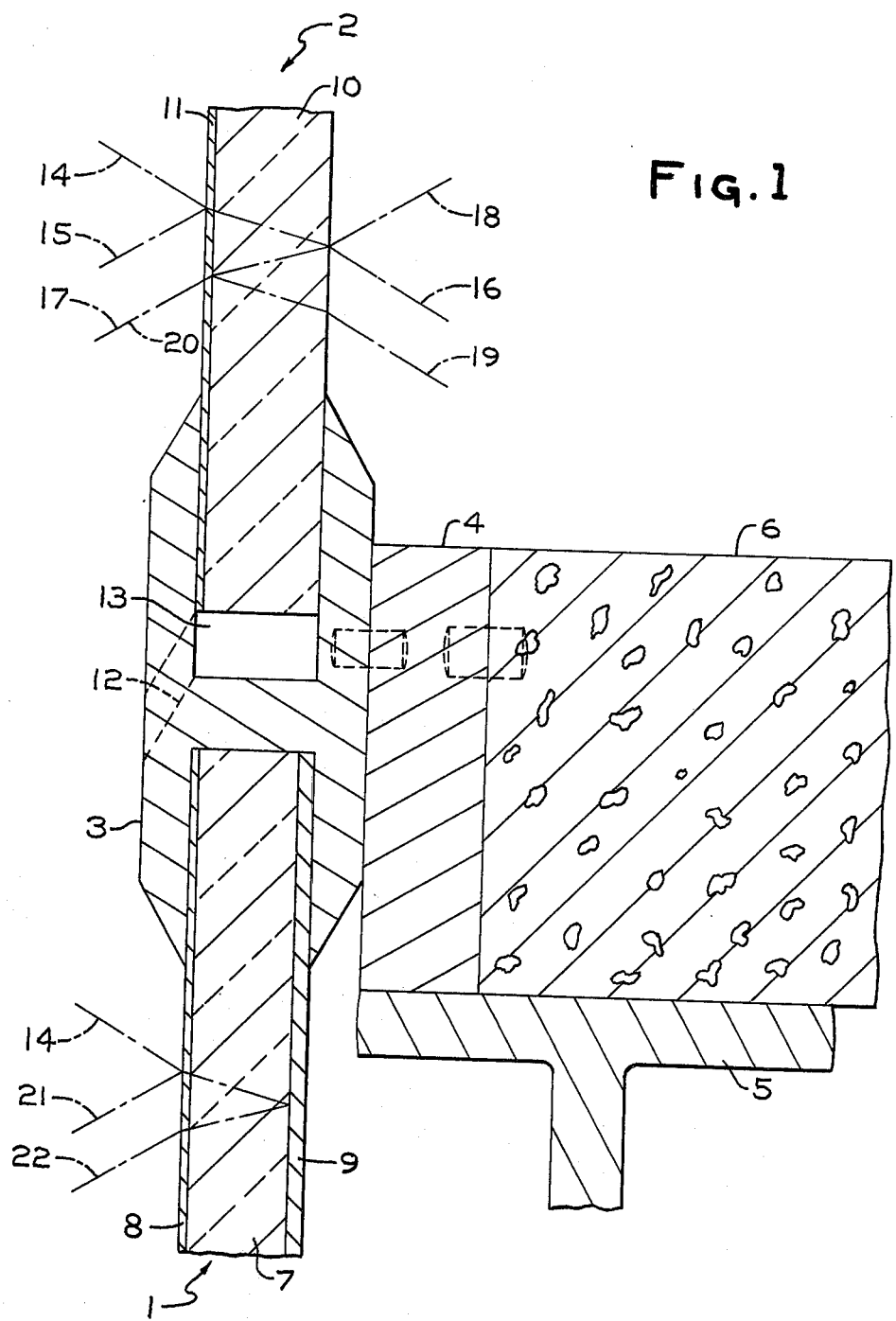
FIG. 1 is a schematic cross-sectional view of a portion of curtainwall showing a vision area glazing panel in combination with a spandrel panel joined by a frame member mounted onto a floor supporting structure.

Referring to FIG. 1, a curtainwall comprises spandrel area panels, 1, and vision area panels, 2, mounted in a frame member, 3. The frame member, 3, is connected to a mounting, 4, which is mounted on a structural member, 5. A floor, 6, which is mounted on structural member, 5, faces the wall area of the frame, 3, and spandrel panel, 1, so that the edge of the floor, 6, the structural member, 5, the mounting, 4, and any material below floor level and above the next lower ceiling are hidden from exterior view by the spandrel panel, 1, and the frame, 3.

The spandrel panel, 1, comprises a transparent substrate, 7, which is preferably a durable refractory material. Most preferably the substrate is glass. On the substrate, 7, are two coatings. Disposed on the exterior, outward facing surface is a transparent, reflective coating, 8, and on the inward facing surface is an opaque, reflective coating, 9.

The vision panel, 2, comprises a transparent substrate, 10, which is preferably a durable refractory material. Most preferably the substrate is glass. Disposed on the exterior outwardly facing surface of the substrate, 10, is a transparent, reflective coating, 11. As in conventional glazing, the frame is provided with weep holes, 12, and a drain space, 13.

Coating, 11, of the vision panel, 2, and coating, 8, of the spandrel panel, 1, are substantially identical. The mere use of identical exterior coatings for the vision panel, 2, and the spandrel panel, 1, does not result in a matching or harmonizing appearance for differing back-lighting prevails in the spandrel and vision areas. The opaque coating, 9, on the spandrel panel, 1, has a reflectivity such that it reflects 15 to 50 percent of incident visible light, 20 to 80 percent of incident infrared energy and preferably at least 35 percent infrared energy. Higher infrared reflectance is desirable to prevent heat buildup in the spandrel areas with consequent air conditioning overloads or occasional glass fracture.

The opaque coating, 9, is found to effectively give the spandrel panel, 1, an appearance closely matching that of a vision panel, 2, backed by a lighted space if the color of the opaque coating is such that its reflective dominant wavelength is substantially the same as that of light transmitted through the corresponding vision panel, 2.

Figure 2:
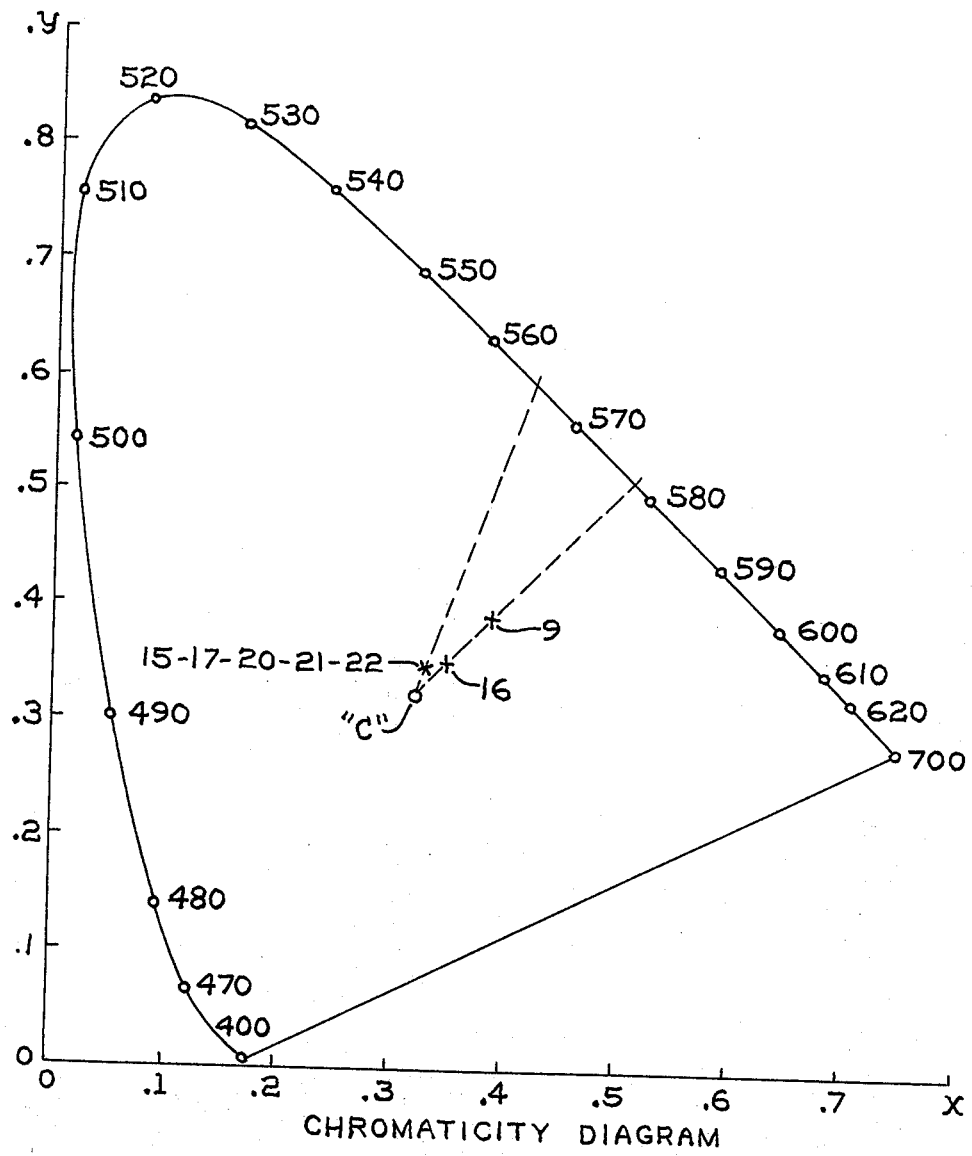
FIG. 2 is a chromaticity diagram showing the significant color characteristics of the spandrel and vision panel comprising the preferred curtainwall according to this invention.

This may be seen with reference to FIG. 2, in combination with FIG. 1. An outdoor ray of light 14 strikes the transparent, reflective coating, 11, of vision panel, 2. A portion of light, 15, is reflected back toward the outdoors from the coating, 11. A portion of light, 16, is transmitted through the coating, 11, and substrate, 10. It is this portion of light, 16, which is characterized as having the transmitted dominant wavelength representing the substrate, 10, in combination with the transparent, reflective coating, 11.

A third portion of light, 17, is reflected from the back surface of the substrate, 10, and is directed outwardly through the coating, 11. Continued internal reflections occur, but their effect is negligible for the purpose of understanding the invention.

The total light reflected, portions 15 and 17, is from about 25 to about 45 percent of the incident light, 14. This is the luminous or visible reflectivity of the coated surface of the vision panel.

With some light behind the vision panel, 2, in the interior of a building there is light, 18, incident on the interior surface of the substrate, 10. A portion of this light, 19, is reflected from the coated surface and a portion, 20, is transmitted mixing with external reflected light 15 and 17. Portions of interior light (not shown) also are reflected internally and from the uncoated surface of the substrate, 10.

In FIG. 2, the color apparent for reflection from the transparent reflective coating side of a glass substrate is indicated by the numerals 15, 17 and 20 corresponding to the reflection rays 15 and 17 and transmitted light, 20 of FIG. 1. The particular coating and substrate illustrated are those of the first example which follows. The transmitted light is indicated by the numeral, 16, corresponding to the transmitted ray, 16 of FIG. 1.

Referring again to FIG. 1, light 14, striking the spandrel panel is both reflected from the coating, 8, as reflected light, 21, and transmitted to the opaque coating, 9, and reflected from it as light, 22. Again internal reflections are ignored. In FIG. 2, the mixture of reflected light 21 and 22 is indicated by numerals 21 and 22. From about 30 to 50 percent of incident light, 20, is reflected as reflected light 21 and 22 from the spandrel panel. In general, the light reflected from the spandrel panel is about 2 to 10 percent greater than the light reflected from the corresponding vision panel.

Although no light is incident on the opaque coating, 9, when the spandrel panel, 1, is installed in a wall, the reflectivity of the coating, 9, at its surface adjacent the substrate, 7, may be considered as being the same as that for the exposed surface facing the structure. Thus, the internal surface reflectivity is determined by measuring the reflectivity of the opaque coating exposed before installation. The dominant wavelength characterizing the coating, i.e., 579 nanometers, is substantially that for the transmitted light of the vision panel, i.e., 579 nanometers, and is represented by the numeral, 9, in FIG. 2.

The excitation purity of the opaque coating is observed to be greater than that for the transmitted light of the vision panel. This is preferred for it results in matching the vision panel with the spandrel panel over a greater range of indoor and outdoor lighting conditions than when the excitation purity of the opaque coating is of the order of 10 percent or less. Nevertheless, opaque coatings of less excitation purity are useful so long as their characteristic dominant wavelength is within about ±5 to ±10 nanometers of the transmission dominant wavelength of the corresponding vision panel.

The present invention may be more fully understood from the following example. This example describes a preferred embodiment which is aesthetically pleasing, durable and highly efficient as a heat screen for air conditioned buildings.

EXAMPLE I

Commercial float glass is produced having a typical X-ray diffraction analysis as follows:

| COMPONENT | PARTS BY WEIGHT (Or Percent by Weight) |
|---|---|
| $SiO_2$ | 73.0 |
| $Na_2O$ | 13.7 |
| $K_2O$ | 0.68 |
| CaO | 8.9 |
| MgO | 3.85 |
| $Al_2O_3$ | 0.11 |
| $SO_3$ | 0.37 |
| $Fe_2O_3$ | 0.128 |

As the glass is being manufactured to a thickness of 0.25 inch, its top surface is coated according to the method of U.S. Pat. No. 3,660,061 to Donley et al.

Between the float bath and the lehr the ribbon of hot glass (1000° to 1100° F.) is contacted with a spray of coating solution.

The solution comprises on a 20 gallon solvent basis the following:

| | |
|---|---|
| Methylene chloride | 221.8 pounds |
| Cobalt Acetylacetonate | 24.8 pounds |
| Iron Acetylacetonate | 3.22 pounds |
| Chromium Acetylacetonate | 8.38 pounds |

The resulting coated glass has the following characteristics when viewed toward the coated surface: Luminous or visible reflectance, 34 percent; total solar ultraviolet reflectance, 26 percent; total solar infrared reflectance, 23 percent; total solar energy reflectance, 29 percent; dominant wavelength, 560 nanometers; excitation purity, 4 percent; chromaticity coordinate $x$ 0.313 and $y$ 0.329.

The coated glass has the following characteristics when viewed toward its uncoated surface: Luminous or visible reflectance, 27 percent; dominant wavelength, 550 nanometers; excitation purity, 4 percent; chromaticity coordinates $x$0.310 and $y$0.333.

The coated glass transmission of light is characterized as follows: Luminous or visible light transmitted, 39 percent; total solar energy transmitted, 44 percent; dominant wavelength, 579 nanometers (see point 16 in FIG. 2); excitation purity, 12 percent; chromaticity coordinates $x$ 0.334 and $y$ 0.338.

Pieces of this coated glass are cut to proper size for vision panels and spandrel panels in curtainwall construction. Those panels for spandrel panels are further processed.

An enamel is applied uniformly over the uncoated or coated surface of the glass pieces for spandrel use. An olive-green to tan appearing ceramic enamel (Drakenfield, EG 10094) is applied to the glass. The enamel frit is analyzed on a dry basis by conventional wet chemical techniques and by conventional absorption spectrophotometric techniques with the following results.

| Wet Chemical Analysis of Dried Frit | |
|---|---|
| $SiO_2$ | 28.60 |
| $Na_2O$ | 2.36 |
| $K_2O$ | .08 |
| CaO | Trace |
| MgO | Trace |
| BaO | .13 |
| PbO | 50.55 |
| $Al_2O_3$ | .76 |
| $ZrO_2$ | 1.26 |
| ZnO | .46 |
| $B_2O_3$ | 3.67 |
| $SO_3$ | .56 |
| $Sb_2O_5$ | None |
| Ign. Loss | 3.24 |
| Absorption Spectrophotometric Analysis | |
| $Fe_2O_3$ | .18 |
| $TiO_2$ | 7.41 |
| CoO | .08 |
| NiO | .01 |
| $Cr_2O_3$ | .27 |
| | 99.62 |

The glass is heated in a muffle furnace for 8 minutes at 1150° F. The article is then cooled to room temperature at a sufficient rate to impart some temper to the coated glass.

The resulting spandrel panel is examined. Viewed toward the transparent, reflective film the article has the following characteristics: Luminous or visible reflectance, 37 percent; total solar ultraviolet reflectance, 29.6 percent; total solar infrared reflectance, 29.8 percent; total solar energy reflectance, 33 percent; dominant wavelength, 566.8 nanometers; excitation purity, 5.9 percent; chromaticity coordinates $x$ 0.317 and $y$ 0.332.

The character of the opaque coating is observed by viewing the article toward that coating. It is characterized as follows: Luminous or visible reflectance, 28.8 percent; total solar ultraviolet reflectance, 9.2 percent; total solar infrared reflectance, 42.2 percent; total solar energy reflectance 33.9 percent; dominant wavelength, 579.6 nanometers; excitation purity, 31.1 percent; chromaticity coordinates $x$ 0.372 and $y$ 0.370.

The spandrel panel is opaque to the unaided eye and has the following properties viewed in transmission: Luminous or visible transmittance 0.7 percent; total solar untraviolet transmittance, 0.2 percent; total solar infrared transmittance, 10.4 percent; and total solar energy transmittance, 5.1 percent.

Vision panels and spandrel panels are mounted in frame members to form a curtainwall about a supporting structure. The interior of the structure faced by spandrel panels is backed by structural members, floors, ceilings and the like and is dark. The interior of the structure faced by vision panels is open and is lighted by transmitted exterior light. The curtainwall structure is viewed under a variety of outdoor lighting conditions. In particular, observations are made under the following conditions: bright, full sunlight with sharply defined shadows; sunlight with haze and poorly defined shadows; bright sunlight with clouds and indistinct shadows; cloudy sky with no apparent sun and no shadows; morning, full sunlight and evening, full sunlight. Under all these conditions the vision panels and spandrel panels match or harmonize sufficiently so that, to the human eye, the entire curtainwall appears uniform in color.

The quantitative characterization of the panels comprising the curtainwall of this example are determined using a conventional spectrophotometer, such as a Beckman DK-2A spectrophotometer, with a standard illuminant "C" and with magnesium carbonate as a standard white reflector. All transmittance, reflectance and color information is presented according to the conventions of the International Commission on Illumination (C.I.E. system) as discussed in Hardy, *Handbook of Colormetry*.

The following example demonstrates the applicability of the principles of this invention using another glass composition and comprises another embodiment of this invention.

EXAMPLE II

Bronze colored glass is float formed and coated with a coating composition like that employed in Example I. The glass composition is that described in U.S. Pat. No. 3,296,004.

The coated glass has the following transmittance characteristics: luminous or visible transmittance, 22 percent; dominant wavelength, 582 nanometers; excitation purity, 20 percent.

Pieces of this glass are cut to proper size for vision panels and spandrel panels in curtainwall construction. Those panels for use as spandrel panels are further processed.

An enamel is applied uniformly over the uncoated surface of the glass pieces for spandrel use. The enamel employed is Drakenfield 10100 which has an olive appearance. The glass is heated in a muffle furnace for 8 minutes at 1150° F. The article is then cooled to room temperature.

The resulting spandrel is examined. The opaque coating has a luminous transmittance of about 27 percent, a dominant wavelength of about 577 nanometers and an excitation purity of about 30 percent. In reflection the vision panels and spandrel panels harmonize over a wide range of lighting conditions. The particular specimen examined appears to match the vision panel best when the space behind the vision panels is darkened.

Several more specimens are prepared using a variety of enamels. Those enamels having reflectance characteristics within the following ranges provide spandrel panels which closely match or harmozine with the vision panels comprising coated, bronze heat absorbing glass: luminous or visible reflectance, 10 to 50 percent; dominant wavelength 570 to 590 nanometers; excitation purity, 10 to 40 percent.

Figure 3:
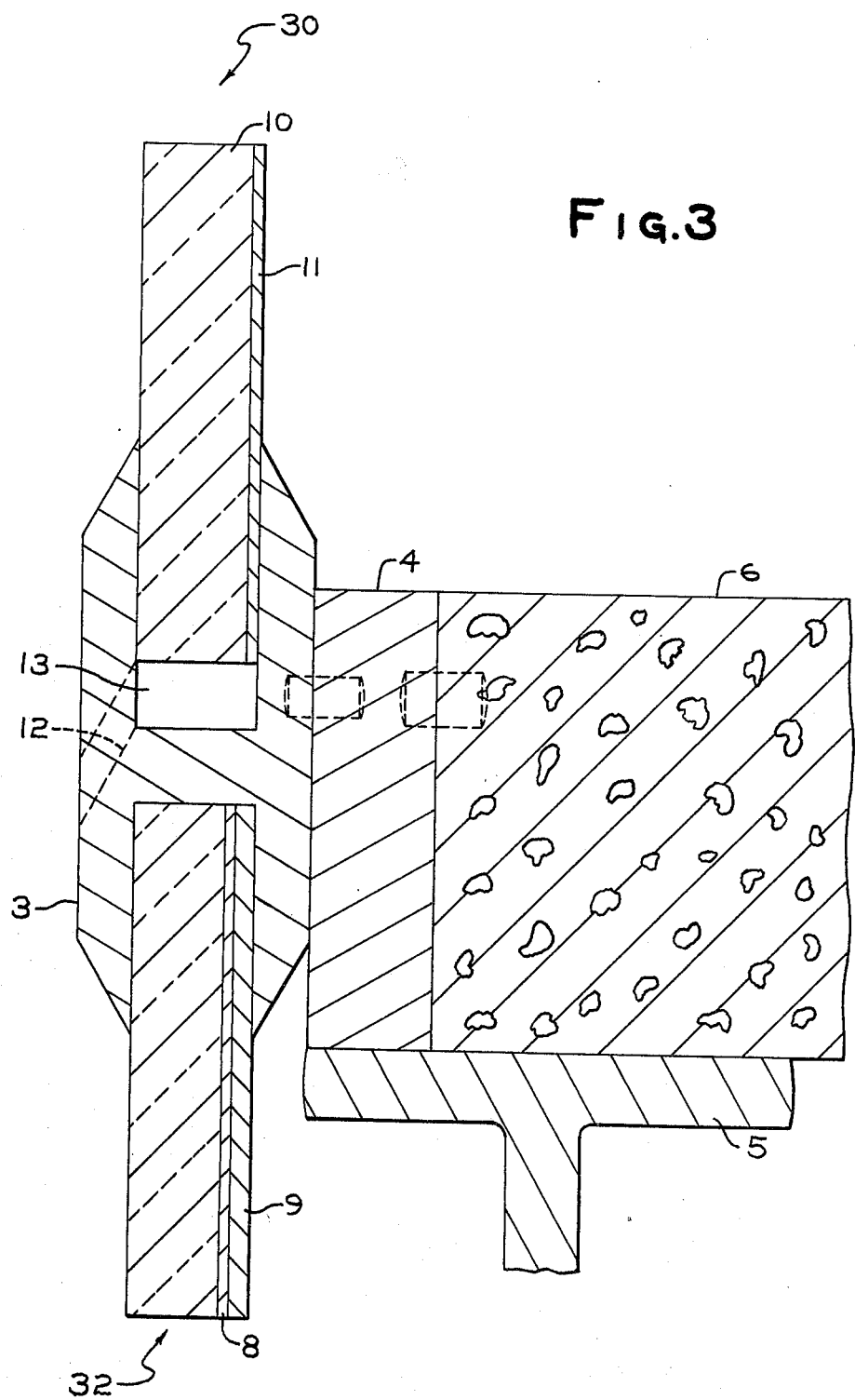
FIG. 3 is a schematic cross-sectional view of a portion of a curtainwall showing a vision area glazing panel in combination with a spandrel panel, incorporating features of the invention, joined by a frame member mounted onto a floor supporting structure.

Referring to FIG. 3, there is shown a curtainwall embodying principles of the instant invention.

The vision area panel 2 is replaced with a vision area panel 30 having the coating 11 on the inwardly facing surface of the substrate 10. The spandrel area panel 1 of FIG. 1 is replaced with spandrel area panel 32. The spandrel area panel 32 has the transparent, reflective coating 8 on the inwardly facing surface of the transparent substrate 7. The opaque, reflective coating 9 is advantageously provided over the inwardly facing surface of the coating 8 as shown in FIG. 3.

The principles of this invention may be employed to prepare spandrels or other coated panels which have the coatings arranged in a manner different from that of the preferred embodiments. So long as the transmittance characteristics of a transparent reflective coating vision panel are employed to dictate the reflectance characteristics of an opaque backing in accordance with the required relationships of this invention, harmonizing panels may be produced. For example, an opaque panel could be employed with an opaque coating disposed over it and a matching transparent, reflective coating over the opaque coating. In this instance the reflectance of the opaque coating would have a dominant wavelength substantially the same as the transmitted dominant wavelength for the transparent reflective coating alone.

Also, the coatings may be on either surface of transparent substrates so long as the outwardly facing reflectance is controlled by the coating relationships and orders established in accordance with this invention.

It will be understood from this disclosure and from the claims that the present invention is not limited to particular materials nor to the particular embodiments now preferred and described here to illustrate this invention. Accordingly, the present invention embraces equivalent embodiments which will become apparent to those skilled in the art from this disclosure and which are embraced by the following claims.

What Is Claimed Is:

1. An article for reflecting visible light comprising:
   a transparent substrate having a first major surface and a second major surface opposite to the first major surface;
   a transparent, reflective coating disposed over substantially all of the first major surface of said substrate, said transparent reflective coating having (1) a transmitted dominant wavelength for visible light, which transmitted dominant wavelength is determined by transmittance to visible light of said substrate and said transparent, reflective coating and (2) a reflectance to visible light which is determined by said transparent reflective coating and the second surface of said substrate; and
   an opaque, reflective coating disposed over substantially all of said transparent, reflective coating, said opaque, reflective coating having a reflective dominant wavelength for visible light substantially equivalent to the transmitted dominant wavelength to provide the article with a total reflectance to visible light that exceeds the visible light reflected from (1) said transparent reflective coating and (2) the second surface of said substrate and to provide the article with a dominant wavelength substantially equivalent to the dominant wavelength of light transmitted through said transparent reflective coating and said substrate.

2. A curtainwall for a structure, the curtainwall comprising in closely spaced relation, vision panels and spandrel panels, the combination having a color harmonizing appearance to the eve under external lighted conditions comprising:

vision panels wherein each of said vision panels comprises:
a transparent substrate having an inwardly facing surface facing the interior of the structure and an outwardly facing surface opposite to the inwardly facing surface; and
a transparent reflective coating of substantially uniform transparency throughout disposed over substantially all of the inwardly facing surface of said transparent substrate, said transparent, reflective coating in combination with said transparent substrate providing each of said vision panels with a transmitted dominant wavelength; and spandrel panels wherein each of said spandrel panels comprises:
a transparent substrate having an inwardly facing surface facing the interior of the structure and an outwardly facing surface opposite to the inwardly facing surface;
a transparent reflective coating substantially identical to that of said vision panel disposed over substantially all of said inwardly facing surface of said transparent substrate of said spandrel; and
an opaque, reflective coating disposed over substantially all of the surface of said last-mentioned transparent reflective coating, said opaque, reflective coating having a reflective dominant wavelength substantially equivalent to the transmitted dominant wavelength of said vision panels.

* * * * *

UNITED STATES PATENT OFFICE
CERTIFICATE OF CORRECTION

PATENT NO. : 3,951,525
DATED : April 20, 1976
INVENTOR(S) : John D. Ballentine

It is certified that error appears in the above-identified patent and that said Letters Patent are hereby corrected as shown below:

Claim 2, line 5, delete "eve" and insert --eye--.

*Signed and Sealed this*

*twenty-second* Day of *June 1976*

[SEAL]

Attest:

RUTH C. MASON
*Attesting Officer*

C. MARSHALL DANN
*Commissioner of Patents and Trademarks*